F. D. McGINLEY & G. LAYCOCK.
CAR REPLACER.
APPLICATION FILED JUNE 16, 1914.
1,119,850.
Patented Dec. 8, 1914.
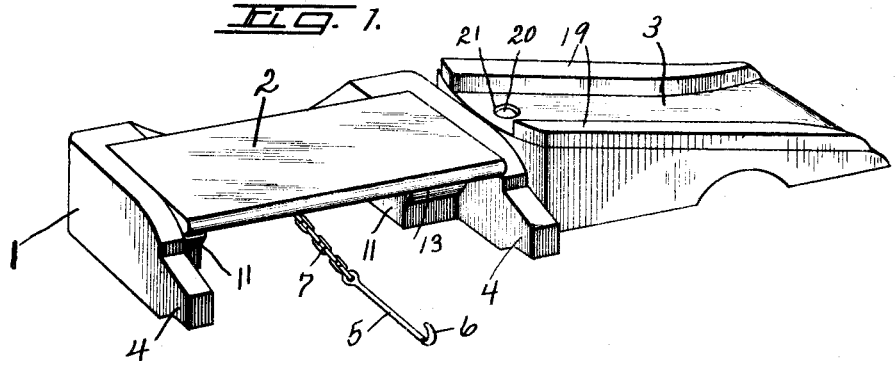
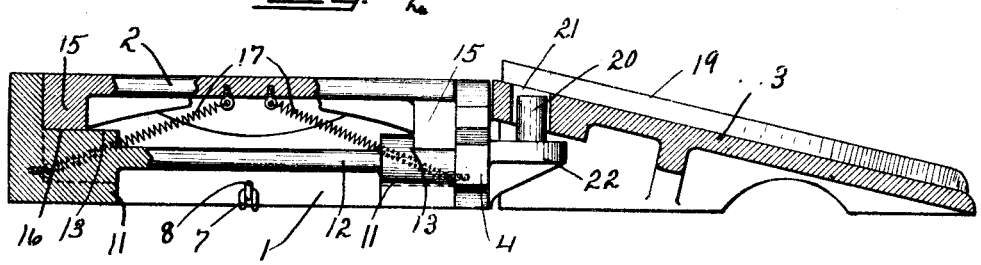
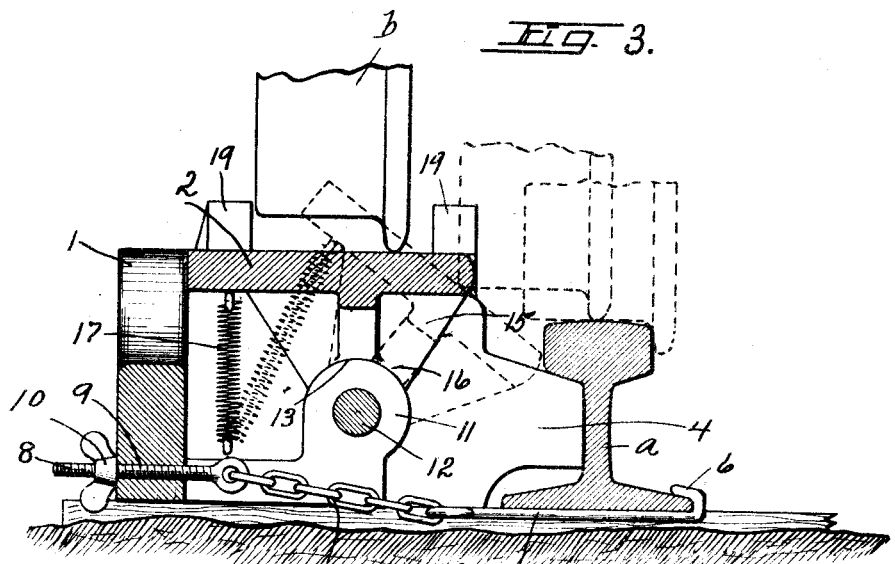
WITNESSES:
INVENTORS
F. D. McGinley
G. Laycock
BY Howard P. Denison
ATTORNEY.

UNITED STATES PATENT OFFICE.

FREDRICK D. McGINLEY AND GILBERT LAYCOCK, OF SYRACUSE, NEW YORK.

CAR-REPLACER.

1,119,850.   Specification of Letters Patent.   Patented Dec. 8, 1914.

Application filed June 16, 1914. Serial No. 845,342.

*To all whom it may concern:*

Be it known that we, FREDRICK D. McGINLEY and GILBERT LAYCOCK, both of Syracuse, in the county of Onondaga, in the State of New York, have invented new and useful Improvements in Car-Replacers, of which the following, taken in connection with the accompanying drawings, is a full, clear, and exact description.

This invention relates to certain improvements in car replacers by which a car may be automatically replaced upon the rails by its own weight when propelled upon the replacer.

The greatest difficulty is experienced in replacing the outer wheels of a derailed car owing to the fact that it is necessary to lift the adjacent sides of the truck sufficiently high to allow the flanges of the wheels to pass over and to the inside of the ball of the rail, while with the opposite wheels it is only necessary to bring the tread on a level with the ball of the adjacent rail and it, therefore, follows that if the device is capable of replacing the outer wheels on the rail, it must also be capable of replacing the inner wheels, particularly when both are used simultaneously under opposite wheels.

One of the objects of our present invention is to construct the tilting platform in such manner that when the flange of the wheel rides upon it at the inner side of the vertical plane of its axis of movement, said platform will be instantly tilted toward the rail and will engage the outer edge of the tread of the wheel during such tilting movement, thereby not only increasing its tilting to accelerate the transverse sliding movement of the truck toward the rails, but will actually lift the wheel sufficiently high to cause the flange of the wheel to clear the inner edge of the ball of the rail, the momentum of the car produced by the sudden tilting of the platform to a short angle being sufficient to replace the trucks upon the rails.

Another object is to provide the replacer with a guide plate capable of being adjusted laterally to different angles relatively to the main supporting frame and rails in alinement with the wheels of a truck which may be displaced a greater or less distance from the rails.

A further object is to construct the replacer in sections which are easily operable and provided with interlocking connections whereby they may be quickly removable or disconnected.

Other objects and uses relating to specific parts of the device will be brought out in the following description.

In the drawings—Figure 1 is a perspective view of a car replacer embodying the various features of our invention. Fig. 2 is a longitudinal sectional view of the same device. Fig. 3 is an enlarged transverse vertical sectional view of the car replacer shown as operatively connected to a rail and also showing a portion of the car wheel resting on the tilting platform, the dotted lines indicating the tilting position of the platform in shifting the car.

This car replacer comprises essentially a base or main supporting frame —1—, a vertically tilting section or platform —2— and a horizontally swinging section or guide plate —3—, all of which parts are assembled one upon the other by detachable interlocking connections to constitute a unitary structure.

The base section —1— preferably consists of a U-shaped frame of somewhat greater transverse width than the face width of an ordinary car wheel and is adapted to rest flatwise upon the ends of the ties at the side of the rail corresponding to that at which the wheels are displaced with the ends of their opposite arms, as —4—, abutting against the web of the rail between the base flange and ball thereof as shown more clearly in Fig. 3, in which position it is held by means of a bar —5— having one end provided with a hook —6— engaged with the base flange of the rail as —*a*— and its opposite end connected by a cable or chain —7— to an adjusting screw —8— which is passed through an aperture —9— in the lengthwise bar of the frame —1— and is provided with a nut —10— by which the connected device may be tightened to hold the car replacer in fixed relation to the rail while replacing a displaced car.

The main supporting frame or base —1— is of sufficient length to receive the greater portion of a car wheel, as —*b*—, between the arms —4— which are located at the ends of the frame and are provided on their inner sides with inwardly projecting bosses —11— connected by tie-rods —12—, the latter serving to brace the arms against lateral strains. The hubs or bosses —11— are provided with circular bearing faces —13— for receiving and supporting a tilting platform —2— which is movable between the arms —4— and is provided with pendant end braces —15— having concave faces —16— resting upon the bearings —13—, thus permitting the platform to tilt from its normal horizontal position toward the rail —a— under the weight of the car wheel —b— which may be propelled upon the platform in a manner presently described.

The platform has a flat upper face and is normally held in a horizontal position against the lengthwise bar of the main supporting frame —1— by means of one or more, in this instance two retracting springs —17—.

The bearings —13— for the tilting platform are located substantially midway between the top and bottom and also between the inner and outer sides of the main supporting frame, the radial distance between the axis of the bearings and upper surface of the tilting platform being slightly less than the radial distance from said axis to the adjacent edge of the ball of the rail to allow the surface of the platform to clear the head of the rail when tilted by the weight of the car wheel thereon.

In Fig. 3, the car replacer is shown as placed at the outside of the track for replacing the adjacent car wheel on the rail in order that the platform may be automatically tilted by the weight of the car wheel thereon to automatically replace such wheel upon the rail, it is necessary to provide means for positioning the car wheel on the platform so that the predominance of weight will be at the inner side of the axis of movement of the platform, and for this purpose, we have provided the inclined plate —3— with opposite guard rails —19— arranged to guide the car wheel when propelled along the inclined plate onto the platform in such manner that the flange of the wheel will rest upon the platform at the inner side of the plane of its axis of movement which causes an instantaneous tilting of the platform toward the rail until the upper surface thereof strikes the outer edge of the tread of the wheel, whereupon the car truck will slide transversely of and upon the platform toward the rail, it being understood that the opposite wheel is mounted upon a similar car replacer to facilitate the replacement of the car. The momentum imparted to the car by this initial tilting movement of the platform causes the platform to tilt to a still steeper angle, thereby causing such platform to crowd the car wheels still farther over and upon the rail until properly seated thereon, whereupon the retracting springs —17— return the platform to its normal position.

The main supporting frame —1— and inclined plate —3— are hinged together, end to end, by means of a pin or stud —20— and socket —21—, the hinged pin —20— being mounted on a central bracket —22— on the adjacent end of the main supporting frame —1— while the socket —21— is formed in the adjacent end of the inclined plate and allows the latter to be quickly detached from the main supporting frame by simply lifting it from the hinged pin —20—. The adjacent end faces of the plate —3— and main supporting frame —1— are convex to allow the plate —3— to swing horizontally to different angles for the purpose of registering its free end with the adjacent car wheel which is to be replaced upon the rail. The bottom of the plate —3— is adapted to rest upon the ties at one side of the rail and its upper face is inclined downwardly from the plane of the platform —2— so that the displaced car may be readily propelled up the incline and onto the platform and automatically replaced upon the rails as soon as the wheels ride upon said platform.

It is obvious from the foregoing description that if the opposite wheel is caused to ride upon a smaller car-replacing platform although the predominance of weight at that side may be at the outside of the vertical plane of the axis of movement of that platform, the fact that the predominance of weight on one of the wheels is at the inside of the vertical plane of the axis of the corresponding platform causes that platform to tilt and to transmit rocking motion to the other platform through the medium of the connected car wheels.

What we claim is:

1. A car replacer comprising a frame, means for connecting the frame to a rail, a tiltable platform on the frame, and a laterally swinging inclined plate leading to the platform for guiding a car wheel onto said platform.

2. A car replacer comprising a frame, a platform hinged to the frame and having a flat upper face forming a support for a car wheel, means for guiding a car wheel onto the platform so that its predominance of weight will engage the platform at one side of the vertical plane of its axis of movement nearest the rail upon which the wheel is to be replaced.

3. A car replacer comprising a frame having abutments for engaging one side of a rail, means for connecting the frame to the rail, a tilting platform mounted on the frame for receiving a car wheel, and an inclined plate hinged to one end of the frame to swing horizontally for guiding the wheel to the platform.

4. A car replacer comprising a frame, means for attaching the frame to a rail, a platform hinged to the frame to swing to and from a horizontal position, and retracting spring for the platform.

5. A car replacer comprising a frame in a fixed position relatively to a rail, a platform hinged to the frame to swing to and from a horizontal position, and an inclined plate hinged to one end of the frame for guiding a car wheel onto the platform.

In witness whereof we have hereunto set our hands this 9th day of June, 1914.

FREDRICK D. McGINLEY.
GILBERT LAYCOCK.

Witnesses:
 A. B. METCALFE,
 GEO. KONRAD.